US011669915B1

(12) United States Patent
Si et al.

(10) Patent No.: US 11,669,915 B1
(45) Date of Patent: Jun. 6, 2023

(54) SYSTEMS AND METHODS FOR MAKING HIGH VALUE ACCOUNT RECOMMENDATIONS

(71) Applicant: META PLATFORMS, INC., Menlo Park, CA (US)

(72) Inventors: Alan Si, San Francisco, CA (US); Jialu Zhu, Mountain View, CA (US); Sourav Chatterji, Fremont, CA (US); Brian Dolhansky, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 1046 days.

(21) Appl. No.: 15/717,898

(22) Filed: Sep. 27, 2017

(51) Int. Cl.
    *G06Q 50/00* (2012.01)
    *G06N 5/04* (2023.01)
    *G06Q 30/0204* (2023.01)
    *G06N 20/00* (2019.01)

(52) U.S. Cl.
    CPC ............... *G06Q 50/01* (2013.01); *G06N 5/04* (2013.01); *G06N 20/00* (2019.01); *G06Q 30/0204* (2013.01)

(58) Field of Classification Search
    CPC .... G06Q 50/01; G06Q 30/0204; G06N 20/00; G06N 5/04
    See application file for complete search history.

(56) References Cited

U.S. PATENT DOCUMENTS

| | | | | |
|---|---|---|---|---|
| 8,595,167 B1* | 11/2013 | Grieve | ............... | G06Q 50/01 706/45 |
| 8,935,346 B2* | 1/2015 | Jackson | ............... | G06Q 50/01 709/206 |
| 9,288,122 B1* | 3/2016 | Zhang | ............... | H04L 43/04 |
| 9,288,123 B1* | 3/2016 | Safford | ............... | G06Q 50/01 |
| 9,641,556 B1* | 5/2017 | Potter | ............... | G06Q 50/01 |
| 10,158,731 B2* | 12/2018 | Chen | ............... | H04L 12/1813 |
| 2006/0265143 A1* | 11/2006 | Taylor | ............... | G01N 21/5907 702/23 |
| 2007/0111246 A1* | 5/2007 | Carrick | ............... | G16B 40/00 435/6.12 |
| 2011/0270649 A1* | 11/2011 | Kerho | ............... | G06Q 30/00 705/7.31 |
| 2012/0041907 A1* | 2/2012 | Wang | ............... | G06Q 30/02 706/12 |

(Continued)

*Primary Examiner* — Omar F Fernandez Rivas
*Assistant Examiner* — Tri T Nguyen
(74) *Attorney, Agent, or Firm* — Sheppard Mullin Richter & Hampton LLP

(57) ABSTRACT

Systems, methods, and non-transitory computer-readable media can identify a set of accounts, each account of the set of accounts having a number of followers. The set of accounts are grouped into a plurality of groups based on number of followers, wherein each group is associated with a value score. A machine learning model is trained using a set of training data comprising account recommendation conversion information, wherein the account recommendation conversion information comprises a plurality of successful account recommendations, and each successful account recommendation is assigned a weight based on the value scores associated with the plurality of groups. One or more accounts of the set of accounts are selected to present as account recommendations based on the machine learning model.

20 Claims, 7 Drawing Sheets

(56) References Cited

U.S. PATENT DOCUMENTS

| | | | | |
|---|---|---|---|---|
| 2012/0143963 | A1* | 6/2012 | Kennberg | G06Q 10/107 709/206 |
| 2012/0158621 | A1* | 6/2012 | Bennett | G06F 16/3337 706/12 |
| 2013/0086641 | A1* | 4/2013 | Mehr | G06F 21/552 726/4 |
| 2013/0103758 | A1* | 4/2013 | Alison | G06Q 50/01 709/204 |
| 2015/0120717 | A1* | 4/2015 | Kim | G06F 16/335 707/727 |
| 2015/0370798 | A1* | 12/2015 | Ju | G06F 16/24578 707/748 |
| 2016/0071162 | A1* | 3/2016 | Ogawa | G06Q 50/01 705/14.66 |
| 2016/0261544 | A1* | 9/2016 | Conover | H04L 67/306 |
| 2018/0006975 | A1* | 1/2018 | Tian | H04L 51/12 |
| 2018/0189288 | A1* | 7/2018 | Zhang | G06F 16/9535 |
| 2018/0308124 | A1* | 10/2018 | Gao | G06N 20/20 |
| 2018/0365580 | A1* | 12/2018 | Musuvathi | G06Q 30/0242 |

\* cited by examiner

| | USER 1 | USER 2 | USER 3 |
|---|---|---|---|
| ACCOUNT A | 1 | 0 | 1 |
| ACCOUNT B | 0 | 10 | 0 |
| ACCOUNT C | 10 | 10 | 10 |
| ACCOUNT D | 0 | 100 | 0 |
| ACCOUNT E | 0 | 100 | 100 |

Identify a set of accounts, each account of the set of accounts having a number of followers
502

Group the set of accounts into a plurality of groups based on number of followers, wherein each group is associated with a value score
504

Train a machine learning model using a set of training data comprising account recommendation conversion information, wherein the account recommendation conversion information comprises a plurality of successful account recommendations, and each successful account recommendation is assigned a weight based on the value scores associated with the plurality of groups
506

Select one or more accounts of the set of accounts to present as account recommendations based on the machine learning model
508

FIGURE 5

SYSTEMS AND METHODS FOR MAKING HIGH VALUE ACCOUNT RECOMMENDATIONS

FIELD OF THE INVENTION

The present technology relates to the field of social networking systems. More particularly, the present technology relates to systems and methods for making high value account recommendations.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users of a social networking system can be given the opportunity to interact with accounts on the social networking system that are associated with other users or entities. For example, a user can "follow" one or more accounts associated with other users. When a user follows an account, the user can be provided with updates about content posted by the account. A user's decision to interact with a particular account on a social networking system generally represents an indication of interest in the account. As the social networking system gains more information about the types of accounts a user interacts with, the social networking system gains knowledge about the user and can utilize that knowledge to optimize information, products, and services offered to the user.

SUMMARY

Various embodiments of the present disclosure can include systems, methods, and non-transitory computer readable media configured to identify a set of accounts, each account of the set of accounts having a number of followers. The set of accounts are grouped into a plurality of groups based on number of followers, wherein each group is associated with a value score. A machine learning model is trained using a set of training data comprising account recommendation conversion information, wherein the account recommendation conversion information comprises a plurality of successful account recommendations, and each successful account recommendation is assigned a weight based on the value scores associated with the plurality of groups. One or more accounts of the set of accounts are selected to present as account recommendations based on the machine learning model.

In an embodiment, the plurality of groups comprises a first group comprising one or more accounts having a number of followers lower than a threshold; and a second group comprising one or more accounts having a number of followers greater than the threshold.

In an embodiment, the value score associated with a first group of the plurality of groups is derived based on a derivative of a portion of a plotted curve associated with the first group.

In an embodiment, the plotted curve comprises a first variable associated with number of followers, and a second variable associated with monthly active users.

In an embodiment, the selecting one or more accounts to present as account recommendations comprises ranking the set of accounts based on the machine learning model, and selecting one or more accounts of the set of accounts based on the ranking.

In an embodiment, the machine learning model comprises a learning to rank algorithm.

In an embodiment, the machine learning model comprises a LambdaMART ranking algorithm.

In an embodiment, the ranking the set of accounts based on the machine learning model comprises: receiving user information associated with a user; and ranking the set of accounts based on the machine learning model and the user information.

In an embodiment, value scores for the plurality of groups are inversely related to an average number of followers for accounts in each group of the plurality of groups.

In an embodiment, the plurality of groups comprises: a first group comprising accounts having a number of followers lower than a first threshold; a second group comprising accounts having a number of followers between the first threshold and a second threshold; and a third group comprising accounts having a number of followers greater than the second threshold.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4 illustrates an example set of training data for training a machine learning model, according to various embodiments of the present disclosure.

FIG. 5 illustrates an example method associated with selecting account recommendations, according to an embodiment of the present disclosure.

Figure 1:
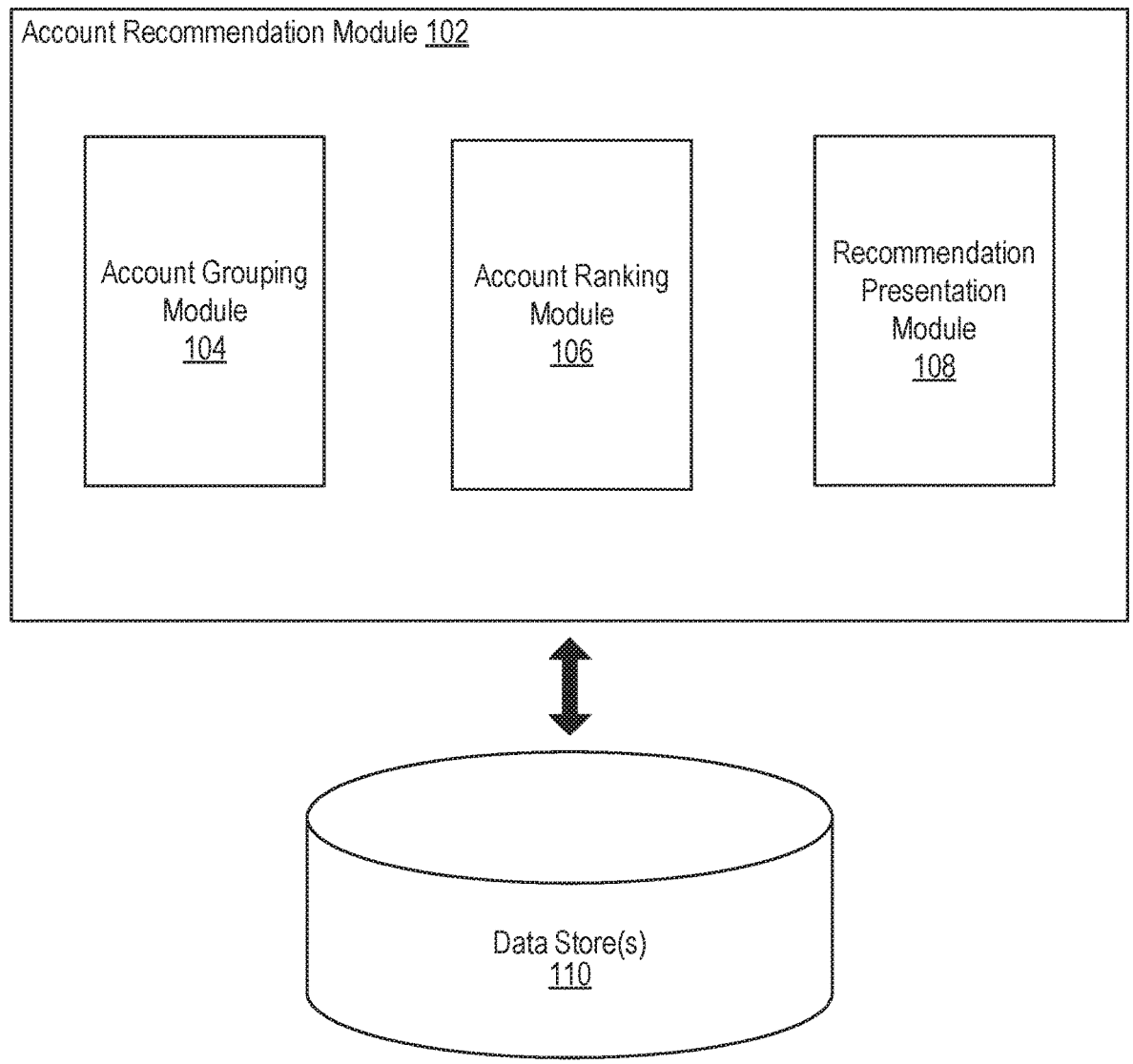
FIG. 1 illustrates an example system including an account recommendation module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

High Value Account Recommendations

People use computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users of a social networking system can be given the opportunity to interact with accounts on the social networking system that are associated with other users or entities. For example, a user can "follow" one or more accounts associated with other users. When a user follows an account, the user can be provided with updates about content posted by the account. Although the terms "follow" and "follower" will be used throughout the present disclosure, it should be understood that these terms can refer to any sort of connection, interaction, or relationship between two accounts on a social networking system, e.g., "liking" another account, "friending" or being "friends" with another account, "connecting" to or being a "connection" of another account, etc. A user's decision to interact with a particular account on a social networking system generally represents an indication of interest in the account. As the social networking system gains more information about the types of accounts a user interacts with, the social networking system gains knowledge about the user and can utilize that knowledge to optimize information, products, and services offered to the user.

Under conventional approaches, users of a social networking system may be provided with recommendations of one or more accounts that they may be interested in following, i.e., account recommendations. Conventional account recommendations have tended to recommend very popular accounts with a large number of followers, as these accounts typically represent accounts having the highest likelihood of being followed when recommended to users. However, a problem arises in that providing account recommendations in this manner leads to the most popular accounts accruing greater numbers of followers, while less popular accounts do not likewise accrue greater numbers of followers. A cyclical effect takes place in which the most popular accounts gain more followers, and are recommended more frequently, leading to even greater numbers of followers. Conversely, less popular accounts may not appreciably increase their number of followers, and are not given the opportunity to accrue significantly more followers as they are not recommended to other users. Users that do not see an appreciable increase in their number of followers over time may be discouraged from posting new content to the social networking system, as they may feel that there is insufficient interest in their posted content. This can lead to a social networking system environment in which only users with the greatest numbers of followers are encouraged to post new content, and users with fewer followers are discouraged from doing so, as their numbers of followers do not seem to grow. Conventional approaches may not be effective in addressing these and other problems arising in computer technology.

An improved approach rooted in computer technology overcomes the foregoing and other disadvantages associated with conventional approaches specifically arising in the realm of computer technology. In general, accounts on a social networking system may be grouped into a plurality of groups based on number of followers. Each group can be assigned a value score having an inverse relationship to the average number of followers per account in the group. In other words, the group having the highest average number of followers can be assigned a lowest value score, while the group having the lowest average number of followers can be assigned a highest value score, and so forth. For example, a first group can comprise all accounts in a set of accounts that have a number of followers below a first threshold. A second group can comprise all accounts in the set of accounts that have a number of followers between the first threshold and a second threshold. A third group can comprise all accounts in the set of accounts that have a number of followers greater than the second threshold. As such, the first group has the smallest average number of followers per account, the second group has the second fewest average number of followers per account, and the third group has the largest average number of followers per account. The first group can be assigned a value score greater than the second and third groups, and the second group can be assigned a value score greater than the third group.

In various embodiments, a machine learning model can be trained to determine account recommendations for users. The machine learning model can be trained using training data that incorporates the value scores. By using training data which incorporates the value scores, the machine learning model can be trained to uprank accounts that have a relatively low number of followers (e.g., are in the first group) and to downrank accounts that have a relatively high number of followers (e.g., are in the third group). In this way, a user on the social networking system may be exposed to account recommendations which include accounts that have a small number of followers, but may be of interest to the user. These concepts and additional features of the disclosed technology will be described in greater detail herein.

FIG. 1 illustrates an example system 100 including an example account recommendation module 102, according to an embodiment of the present disclosure. The account recommendation module 102 can be configured to automatically identify, for a particular user, one or more accounts on a social networking system and to provide the one or more accounts to the user as account recommendations. In various embodiments, the account recommendation module 102 can be configured to group a set of accounts (e.g., all accounts on the social networking system) into a plurality of groups based on a number of followers associated with each account. For example, a first group can include all accounts in the set of accounts that have a number of followers below a first threshold (i.e., a low follower group). A second group can include all accounts in the set of accounts that have a number of followers between the first threshold and a second threshold (i.e., a medium follower group). A third group can include all accounts in the set of accounts that have a number of followers above the second threshold (i.e., a high follower group). In other examples, a set of accounts can be grouped into a number of groups other than three.

Each group can be associated with a value score, and each account in a particular group can be assigned the value score associated with the group. For example, each account in the first group can be assigned a first value score, each account in the second group can be assigned a second value score, and each account in the third group can be assigned a third value score. In certain embodiments, the value scores for the plurality of groups can be in inverse relationship to the average number of followers per account for each group. For example, assume that the first group has a lower average number of followers than the second group, and the second group has a lower average number of followers than the third group. Therefore, the first value score can be greater than the second value score, and the second value score can be greater than the third value score. The inverse relationship between value score and average number of followers is due to the relative value of each additional follower for accounts in each group. The first group has accounts with a relatively low number of followers. As such, each additional follower for accounts in the first group represents a greater benefit to these accounts than to accounts in the second or third groups. For example, an additional follower for an account that has 50 followers is more meaningful and has more value for that account than an additional follower for an account that has over a million followers.

In various embodiments, the account recommendation module 102 can be configured to rank a set of accounts based on a machine learning model trained to apply various ranking criteria. The machine learning model can be trained using account recommendation conversion information comprising past outcomes of previous account recommendations to determine which accounts a user is most likely to follow when the user is presented with the accounts as account recommendations. The account recommendation conversion information used to train the machine learning model can be weighted using the value scores, such that the machine learning model is trained to accord greater value to accounts having higher value scores. For example, the machine learning model can be trained to accord greater value to successful conversions in which users followed accounts in the first group (having a lower number of followers and a higher value score) than successful conversions in which users followed accounts in the second or third groups (having relatively higher numbers of followers and lower value scores). In this way, the machine learning model can be trained to identify accounts that a user is most likely to follow, while giving preference to or upranking accounts that have a lower number of followers. The account recommendation module 102 can utilize the machine learning model to identify one or more account recommendations for a user, and to present the one or more account recommendations to the user.

As shown in the example of FIG. 1, the account recommendation module 102 can include an account grouping module 104, an account ranking module 106, and a recommendation presentation module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the account recommendation module 102 can be implemented in any suitable combinations.

In some embodiments, the account recommendation module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the account recommendation module 102 can be implemented, in part or in whole, as software running on one or more computing devices or systems, such as on a user or client computing device. For example, the account recommendation module 102, or at least a portion thereof, can be implemented as or within an application (e.g., app), a program, or an applet, etc., running on a user computing device or a client computing system, such as the user device 610 of FIG. 6. In another example, the account recommendation module 102, or at least a portion thereof, can be implemented using one or more computing devices or systems that include one or more servers, such as network servers or cloud servers. In some instances, the account recommendation module 102 can, in part or in whole, be implemented within or configured to operate in conjunction with a social networking system (or service), such as the social networking system 630 of FIG. 6. It should be understood that there can be many variations or other possibilities.

The account recommendation module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social engagements, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the account recommendation module 102. For example, the data store 110 can store account grouping criteria, account group information, value scores, training data, one or more machine learning models, and the like. It is contemplated that there can be many variations or other possibilities.

The account grouping module 104 can be configured to group a set of accounts into a plurality of groups based on account grouping criteria. In certain embodiments, accounts may be grouped based on a number of followers associated with each account. For example, the account grouping module 104 can be configured to assign all accounts having a number of followers below a first threshold to a first group (e.g., a low follower group). The account grouping module 104 can be configured to assign all accounts having a number of followers between the first threshold and a second threshold to a second group (e.g., a medium follower group). The account grouping module 104 can be configured to assign all accounts having a number of followers above the second threshold to a third group (e.g., a high follower group). In different embodiments, more or fewer groups are possible.

The account grouping module 104 can associate each group with a value score. The value score may be inversely proportional to an average number of followers for accounts in the various groups. For example, the first group, averaging the lowest number of followers, can be assigned a highest value score, the third group, averaging the highest number of followers, can be assigned a lowest value score, and the second group, averaging an intermediate number of followers, can be assigned a value score between the first group and the third group.

In certain embodiments, value scores can be calculated based on a graph, or a plotted curve, comprising number of followers on one axis and a value metric to be optimized on a second axis. For example, the value metric may be a percentage of monthly active users (e.g., percentage of users who have accessed a social networking system within the past 30 days or past 45 days). In this example, the number of followers can be plotted on the x-axis, and percentage of monthly active users can be plotted on the y-axis. The first group can be represented by a first, leftmost portion of the plotted curve (with the lowest number of followers), the second group can be represented by a second, middle portion of the plotted curve (with an intermediate number of followers), and the third group can be represented by a third, rightmost portion of the plotted curve (with the highest number of followers). The value score associated with the first group can be calculated based on a derivative of the leftmost portion of the plotted curve, the value score associated with the second group can be calculated based on a derivative of the middle portion of the plotted curve, and the value score associated with the third group can be calculated based on a derivative of the rightmost portion of the plotted curve. Additional details are provided herein with reference to an example scenario depicted in FIG. 3.

While various examples are described herein for clarity of explanation, it should be understood that many variations are possible. For example, there may be fewer or more groups into which accounts may be grouped. In another example, the value metric to be optimized can be any other value metric that may be optimized, such as a percentage or number of users that have posted content within a threshold period of time. Furthermore, while the example scenarios described herein make reference to a single plotted curve plotting accounts based on number of followers and a value metric to be optimized, additional graphs may be generated and other variables may be used. For example, the x-axis may represent any account characteristic, such as a user age associated with an account, a user gender associated with an account, etc. In another example, multiple graphs can be generated for different subsets of accounts to create different value scores. For example, a first graph may include all male accounts, and a second graph may include all female accounts, and value scores can be calculated for male accounts using derivatives from various portions of the first graph, and value scores can be calculated for female accounts using derivatives from various portions of the second graph.

The account ranking module 106 can be configured to rank a set of accounts based on various ranking criteria. In certain embodiments, the various ranking criteria can be implemented using a machine learning model. The machine learning model can be trained using account recommendation conversion information. Account recommendation conversion information can include, for example, previous instances in which users were presented with an account recommendation, and data as to which account recommendations led a user to follow an account, i.e., a successful conversion, and which did not. The machine learning model can review the past social networking system interaction information to determine the effect of various user and account characteristics on the likelihood of a particular user to follow an account when the account is presented as an account recommendation. In various embodiments, the account recommendation conversion information can be weighted using value scores associated with each account. For example, each successful conversion in which a user followed an account based on an account recommendation can be assigned a weight based on the value score associated with the account. Once the model is trained, the model can be provided with user information for a particular user, and a set of accounts. The model can rank the set of accounts based on a likelihood that the particular user will follow an account if the account is presented as an account recommendation and based on value scores. Once the set of accounts has been ranked, the account ranking module 106 can select one or more accounts of the set of accounts to present as account recommendations. The account ranking module 106 is described in greater detail herein with reference to FIG. 2.

The recommendation presentation module 108 can be configured to present one or more account recommendations to a user. As mentioned above, once the account ranking module 106 has ranked a set of accounts, one or more accounts can be selected based on the ranking. The one or more accounts can be presented to a user as account recommendations. For example, a user interface can be provided in which the user is presented with each of the one or more accounts. Each account presented can be accompanied by an option to follow the account (e.g., a "follow" button).

Figure 2:
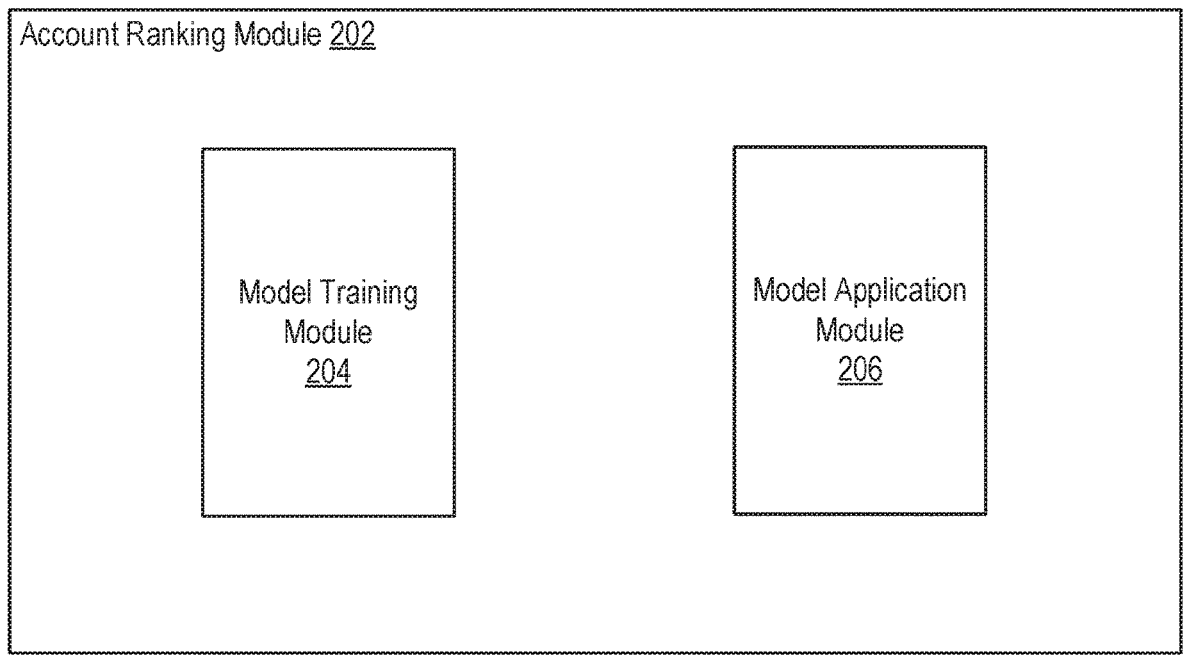
FIG. 2 illustrates an example account ranking module, according to various embodiments of the present disclosure.

FIG. 2 illustrates an example account ranking module 202 configured to rank a set of accounts, according to an embodiment of the present disclosure. In some embodiments, the account ranking module 106 of FIG. 1 can be implemented as the account ranking module 202. As shown in the example of FIG. 2, the account ranking module 202 can include a model training module 204 and a model application module 206.

The model training module 204 can be configured to train a machine learning model based on account recommendation conversion information. The machine learning model can be trained, using account recommendation conversion information, to rank a set of accounts based on a likelihood that a particular user, defined by various user characteristics, will follow a particular account, defined by various account characteristics, if the particular account is recommended to the user as an account recommendation. User characteristics can include any number of user characteristics believed to be relevant to the ultimate determination of likelihood to follow a particular account. These can include, for example, user demographic information (e.g., age, income, location of residence), user social graph information (e.g., number of friends or followers), the number of the user's friends who have also followed (or otherwise interacted with) the particular account, account information for other accounts followed by the user, etc. Similarly, account characteristics can include any characteristics that are believed to be relevant to the ultimate determination of a user to follow the particular account. This can include, for example, total number of followers for an account, demographic information for the particular account's followers, and the like.

Account recommendation conversion information used as training data for the machine learning model can also include value scores associated with accounts. For example, successful conversions of users following accounts after being presented with account recommendations can be weighted based on a value score associated with the account that was followed. In this way, the machine learning model can be trained to uprank conversions of accounts with high value scores which, in various embodiments, are accounts having a low number of followers. A sample set of training data is described in greater detail herein with reference to FIG. 4. In certain embodiments, the machine learning model and/or a value model can be trained using, for example, a learning to rank machine learning algorithm, such as the LambdaMART ranking algorithm.

The model application module 206 can be configured to rank a set of accounts based on the machine learning model trained by the model training module 204. As discussed above, the machine learning model can be trained based on account recommendation conversion information to rank accounts based on a likelihood that a user, having particular user characteristics, will follow an account, having account characteristics, if the account is presented as an account recommendation to the user. The set of accounts (e.g., all accounts on a social networking system, or all accounts on a social networking system not currently followed by the user) can be ranked based on likelihood of being followed by the user. However, due to the weighting of various conversions based on account value scores, the ranking would not necessarily be based strictly on likelihood of being followed. Rather, the ranking would be further based on account value scores, such that the ranking takes into account both likelihood of being followed and account value scores. For example, consider an example scenario in which a first account has a first value score, and a second account has a second value score that is 2.5 times greater than the first value score. In certain embodiments, in order for the first account to be ranked ahead of the second account, the first account must be more than 2.5 times more likely to be followed by a user than the second account, as determined by the machine learning model. As such, even if the first account is determined to be two times more likely to be followed by a user than the second account, the second account's greater value score, which is 2.5 times greater than the first account's value score, would still result in the second account being ranked ahead of the first account. Once the machine learning model has ranked the set of accounts, the model application module 206 can select one or more accounts from the set of accounts for presentation to a user as account recommendations based on the ranking. For example, the top n accounts can be selected for presentation to the user as account recommendations.

Figure 3:
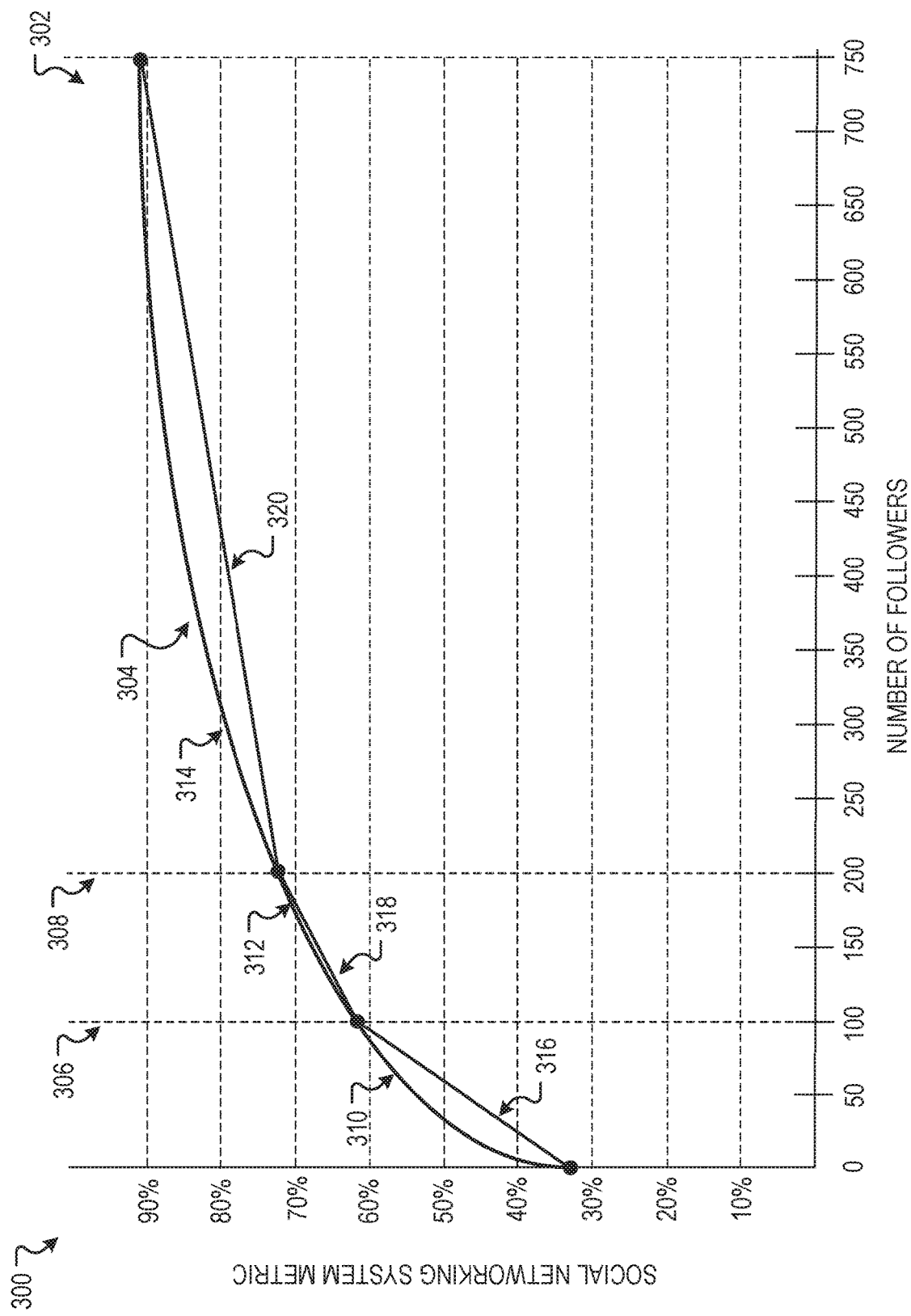
FIG. 3 illustrates an example scenario associated with determining one or more groups of accounts, and determining value scores for each group of accounts, according to various embodiments of the present disclosure.

FIG. 3 illustrates an example scenario 300 associated with grouping a set of accounts into a plurality of groups, and determining value scores for each group of accounts based on a plotted curve, according to an embodiment of the present disclosure. The example scenario 300 is depicted in a graph 302, in which number of followers is plotted on the x-axis, and a social networking system metric is plotted on the y-axis. One example of a social networking system metric may be a percentage of users retained after x days (e.g., after 30 days). For example, the y-axis can be an indication of the percentage of users that were active within the next month or 30 days. The graph 302 includes a plotted curve 304 depicting the relationship between number of followers and the social networking system metric. For example, if the social networking system metric is the percentage of users that were active within the next x days, the plotted curve 304 demonstrates that accounts with a higher number of followers are more likely to be active on a social networking system. For example, in the example scenario 300, approximately 54% of accounts that have 50 followers were active within the next x days, while approximately 87% of accounts that have 500 followers were active within the next x days. This is just one example of a social networking system metric. In various embodiments, the y-axis can be any social networking system metric such that the plot demonstrates the effect that "number of followers" has on the social networking system metric. For example, this could include percentage of users who are active in a particular time period, percentage of users who use a social networking system application or access a social networking system webpage in a particular time period, percentage of users who post a content item in a particular time period, percentage of users who post a comment or like a content item in a particular time period, and the like.

In the example scenario 300, the set of accounts represented in the plotted curve 304 are divided into three groups using two thresholds 306, 308. A first threshold 306 is placed at 100 followers, and a second threshold 308 is placed at 200 followers. All accounts having less than 100 followers are placed in a first group, all accounts having between 100 and 200 followers are placed in a second group, and all accounts having greater than 200 followers are placed in a third group.

Each group can be associated with a value score, and each account in each group can be associated with the value score associated with the group. In certain embodiments, a group's value score can be determined based on a derivative of a portion of the plotted curve 304 associated with the group. For example, the first group is represented by and associated with a leftmost portion 310 of the plotted curve 304, extending from 0 followers to 100 followers on the x-axis. The second group is represented by and associated with a middle portion 312 of the plotted curve 304, extending from 100 followers to 200 followers on the x-axis. The third group is represented by and associated with a rightmost portion 314 of the plotted curve 304, extending from 200 followers to 750 followers on the x-axis. The value score for the first group can be determined based on a derivative or slope of the leftmost portion 310. The slope of the leftmost portion 310 is represented by a line segment 316, and in the example scenario 300, is approximately 0.3. As such, each account in the first group can be assigned a value score of 0.3. The slope of the middle portion 312 is represented by a line segment 318, and, in the example scenario 300, is approximately 0.1. Each account in the second group is assigned a value score of 0.1. The slope of the rightmost portion 314 is represented by a line segment 320, and is approximately 0.04. Each account in the third group is assigned a value score of 0.04. It should be understood that these values are exemplary, and, in certain embodiments, are dependent on which social networking system metric(s) are selected. As such, in other embodiments, other values may be used.

FIG. 4 illustrates an example set of training data 400 associated with training a machine learning model, according to various embodiments of the present disclosure. The training data 400 includes account recommendation conversion information, wherein each row is associated with a particular account (Accounts A, B, C, D, and E) and each column is associated with a particular user (Users 1, 2, and 3). Accounts A, B, C, D, and E were recommended to Users 1, 2, and 3 as account recommendations. If a cell in a particular account's row and a particular user's column is a zero value, this represents an unsuccessful conversion, i.e., the user did not follow the account when presented with the account recommendation. However, if a cell in a particular account's row and a particular user's column is a non-zero value, this represents a successful conversion, i.e., the user followed the account when presented with the account recommendation.

In the example set of training data 400, for a particular social networking system metric or set of social networking system metrics, accounts in a first, low follower group can be assigned a value score in a first range, accounts in a second, medium follower group can be assigned a value score in a second range, and accounts in a third, high follower group can be assigned a value score in a third range. For example, in the example set of training data 400, accounts in a first, low follower group can be assigned a value score in a first range, such as 100, accounts in a second, middle follower group can be assigned a value score in a second range, such as 10, and accounts in a third, high follower group can be assigned a value score in a third range, such as 1. In the example set of training data 400, Account A is in the third group, Accounts B and C are in the second group, and Accounts D and E are in the first group. The first range, the second range, and/or the third range may, in various embodiments, be overlapping or, in other embodiments, may be non-overlapping. The first range, the second range, and/or the third range may, in various embodiments, comprise a single value or multiple values. It should be understood that that these values are exemplary and, in other embodiments, other values may be used.

The training data 400 indicates that when the Account A was presented to User 1 as an account recommendation, User 1 followed Account A. This is indicated by the non-zero value in the cell in User 1's column and Account A's row. This instance of a successful account recommendation is accorded a weight of 1, equal to Account A's value score. When Account A was presented to User 2 as an account recommendation, User 2 did not follow Account A, resulting in a value of 0. When Account A was presented to User 3 as an account recommendation, User 3 followed Account A, resulting in a weight of 1. As mentioned above, Account B is in the second group, which has fewer average followers and a higher value score than accounts in the first group, such as Account A. As such, when Account B was presented to User 2, and User 2 followed Account B, this instance of a successful account recommendation is assigned a weight of 10, equal to Account B's value score. Account C, when presented as an account recommendation to Users 1, 2, and 3, was followed by all three users. Each of these successful account recommendations are assigned a weight of 10. Account D, when presented as an account recommendation, was not followed by Users 1 or 3.

However, User 2 did follow Account D. Since Account D is in the first, low follower group, it is assigned a value score of 100, and the successful conversion of User 2 to follow Account D is assigned a weight of 100. Similarly, Account E is in the first group, and successful conversions of Users 2 and 3 are assigned weights of 100. By weighting the account recommendation conversion information in the training data 400 based on account value scores, a machine learning model can be trained to rank accounts based not only on a likelihood of a user following an account presented as an account recommendation, but also based on an account's number of followers, as indicated by value score.

FIG. 5 illustrates an example method 500 associated with selecting one or more account recommendations, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can identify a set of accounts, each account of the set of accounts having a number of followers. At block 504, the example method 500 can group the set of accounts into a plurality of groups based on number of followers, wherein each group is associated with a value score. At block 506, the example method 500 can train a machine learning model using a set of training data comprising account recommendation conversion information, wherein the account recommendation conversion information comprises a plurality of successful account recommendations, and each account recommendation is assigned a weight based on the value scores associated with the plurality of groups. At block 508, the example method 500 can select one or more accounts of the set of accounts to present as account recommendations based on the machine learning model.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
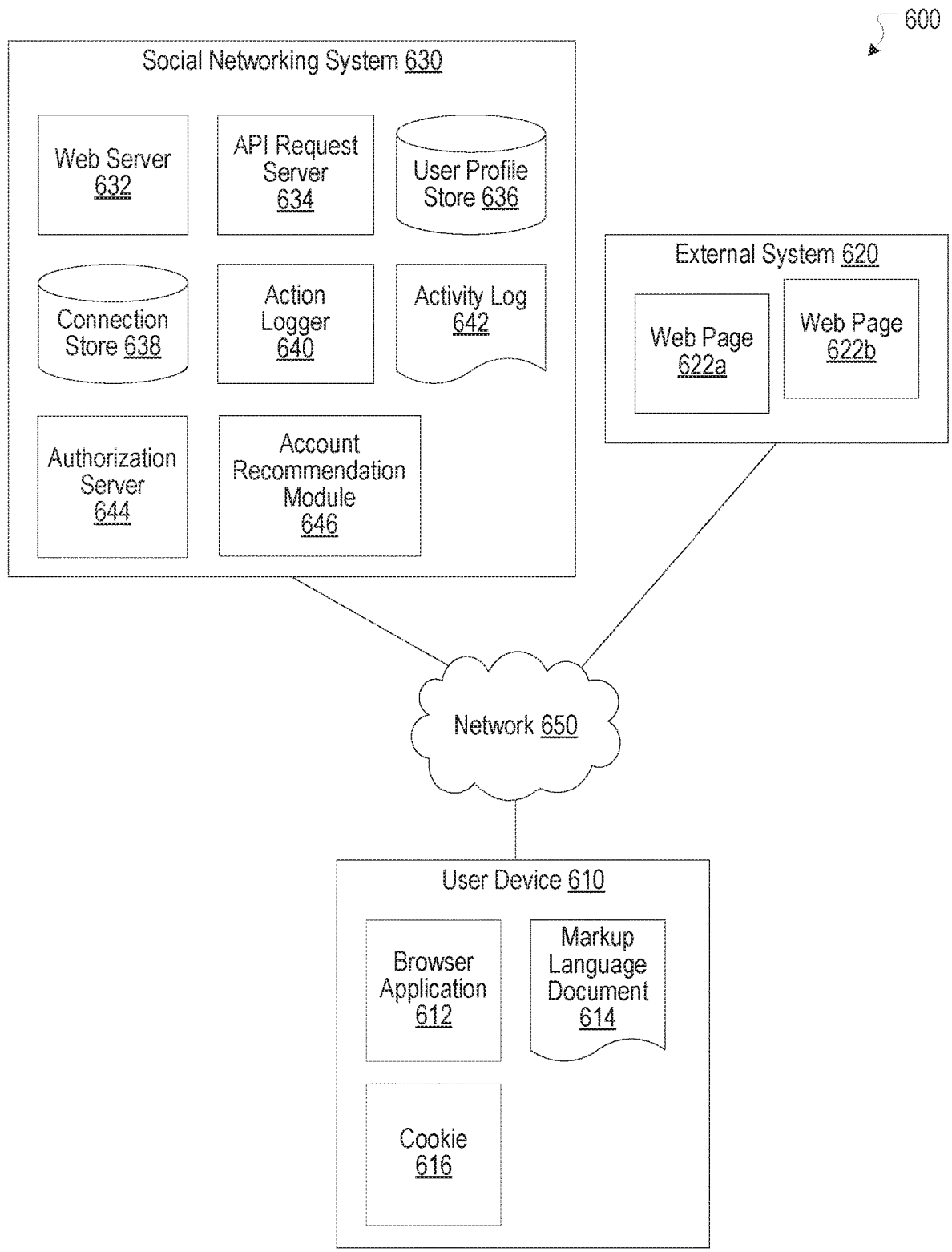
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing engagements between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and engagements with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and engagements.

The social networking system 630 also includes user-generated content, which enhances a user's engagements with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the engagement of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the engagements and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's engagement with an external system 620 from the web server 632. In this example, the external system 620 reports a user's engagement according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing engagements between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an account recommendation module 646. The account recommendation module 646 can, for example, be implemented as the account recommendation module 102, as discussed in more detail herein. As discussed previously, it should be appreciated that there can be many variations or other possibilities. For example, in some embodiments, one or more functionalities of the account recommendation module 646 can be implemented in the user device 610.

Hardware Implementation

Figure 7:
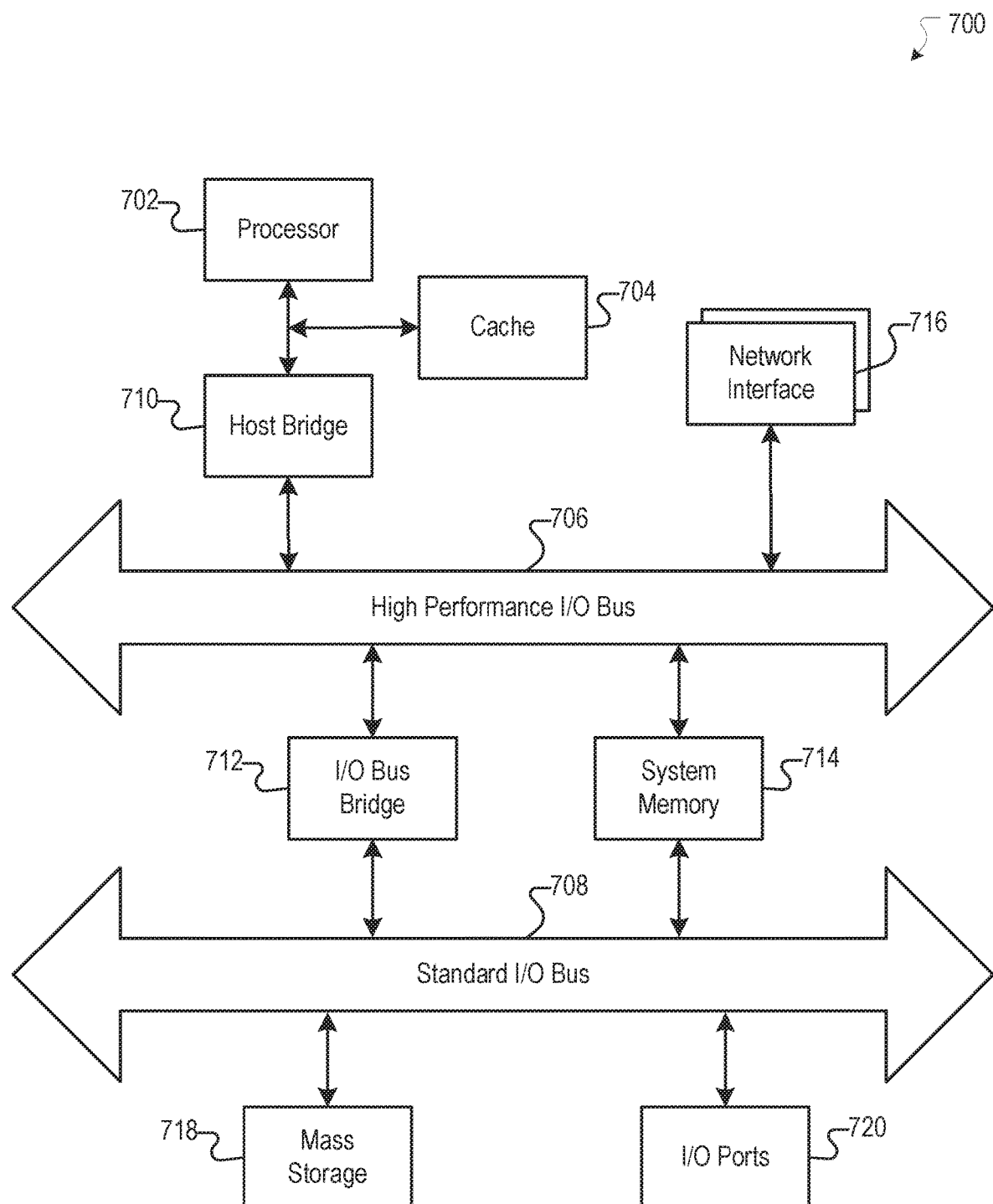
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, by a computing system, a set of accounts, each account of the set of accounts having a number of followers;
   grouping, by the computing system, the set of accounts into a plurality of groups based on number of followers, wherein each group is associated with a value score;
   training, by the computing system, a machine learning model using a set of training data, wherein
      the training data includes a plurality of successful account recommendations and associated weights based on value scores,
      the plurality of successful account recommendations are associated with a training set of accounts,
      the training set of accounts are associated with a training plurality of groups,
      each group in the training plurality of groups
         i) includes a plurality of accounts,
         ii) is associated with a predetermined range of numbers of followers of accounts in the group, wherein the plurality of groups comprises: a first group comprising accounts, each account in the first group having a number of followers lower than a first threshold; a second group comprising accounts, each account in the second group having a number of followers between the first threshold and a second threshold; and a third group comprising accounts, each account in the third group having a number of followers greater than the second threshold, and
         iii) has a corresponding value score that is inversely related to an average number of followers for accounts in the group, wherein the first group has a value score greater than the second and third groups, and the second group has a value score greater than the third group, and
      each successful account recommendation of the training data is assigned a weight based on a value score associated with a respective group with which the successful account recommendation is associated; and
   selecting, by the computing system, one or more accounts of the set of accounts to present as account recommendations based on the machine learning model.

2. The computer-implemented method of claim 1, wherein the plurality of groups comprises
   a first group comprising one or more accounts having a number of followers lower than a threshold; and
   a second group comprising one or more accounts having a number of followers greater than the threshold.

3. The computer-implemented method of claim 1, wherein the value score associated with a first group of the plurality of groups is derived based on a derivative of a portion of a plotted curve associated with the first group.

4. The computer-implemented method of claim 3, wherein the plotted curve comprises a first variable associated with number of followers, and a second variable associated with monthly active users.

5. The computer-implemented method of claim 1, wherein the selecting one or more accounts to present as account recommendations comprises
ranking the set of accounts based on the machine learning model, and
selecting one or more accounts of the set of accounts based on the ranking.

6. The computer-implemented method of claim 5, wherein the machine learning model comprises a learning to rank algorithm.

7. The computer-implemented method of claim 6, wherein the machine learning model comprises a LambdaMART ranking algorithm.

8. The computer-implemented method of claim 5, wherein the ranking the set of accounts based on the machine learning model comprises:
receiving user information associated with a user; and
ranking the set of accounts based on the machine learning model and the user information.

9. The computer-implemented method of claim 1, wherein the number of groups in the training plurality of groups is equal to the number of value scores.

10. A system comprising:
at least one processor; and
a memory storing instructions that, when executed by the at least one processor, cause the system to perform a method comprising:
identifying a set of accounts, each account of the set of accounts having a number of followers;
grouping the set of accounts into a plurality of groups based on number of followers, wherein each group is associated with a value score;
training a machine learning model using a set of training data, wherein
the training data includes a plurality of successful account recommendations and associated weights based on value scores,
the plurality of successful account recommendations are associated with a training set of accounts,
the training set of accounts are associated with a training plurality of groups,
each group in the training plurality of groups
i) includes a plurality of accounts,
ii) is associated with a predetermined range of numbers of followers of accounts in the group, wherein the plurality of groups comprises: a first group comprising accounts, each account in the first group having a number of followers lower than a first threshold; a second group comprising accounts, each account in the second group having a number of followers between the first threshold and a second threshold; and a third group comprising accounts, each account in the third group having a number of followers greater than the second threshold, and
iii) has a corresponding value score that is inversely related to an average number of followers for accounts in the group, wherein the first group has a value score greater than the second and third groups, and the second group has a value score greater than the third group, and
each successful account recommendation of the training data is assigned a weight based on a value score associated with a respective group with which the successful account recommendation is associated;
and
selecting one or more accounts of the set of accounts to present as account recommendations based on the machine learning model.

11. The system of claim 10, wherein the plurality of groups comprises
a first group comprising one or more accounts having a number of followers lower than a threshold; and
a second group comprising one or more accounts having a number of followers greater than the threshold.

12. The system of claim 10, wherein the value score associated with a first group of the plurality of groups is derived based on a derivative of a portion of a plotted curve associated with the first group.

13. The system of claim 12, wherein the plotted curve comprises a first variable associated with number of followers, and a second variable associated with monthly active users.

14. The system of claim 10, wherein the selecting one or more accounts to present as account recommendations comprises
ranking the set of accounts based on the machine learning model, and
selecting one or more accounts of the set of accounts based on the ranking.

15. The system of claim 10, wherein the number of groups in the training plurality of groups is equal to the number of value scores.

16. A non-transitory computer-readable storage medium including instructions that, when executed by at least one processor of a computing system, cause the computing system to perform a method comprising:
identifying a set of accounts, each account of the set of accounts having a number of followers;
grouping the set of accounts into a plurality of groups based on number of followers, wherein each group is associated with a value score;
training a machine learning model using a set of training data, wherein
the training data includes a plurality of successful account recommendations and associated weights based on value scores,
the plurality of successful account recommendations are associated with a training set of accounts,
the training set of accounts are associated with a training plurality of groups,
each group in the training plurality of groups
i) includes a plurality of accounts,
ii) is associated with a predetermined range of numbers of followers of accounts in the group, wherein the plurality of groups comprises: a first group comprising accounts, each account in the first group having a number of followers lower than a first threshold; a second group comprising accounts, each account in the second group having a number of followers between the first threshold and a second threshold; and a third group comprising accounts, each account in the third group having a number of followers greater than the second threshold, and
iii) has a corresponding value score that is inversely related to an average number of followers for accounts in the group, wherein the first group has a value score greater than the second and third groups, and the second group has a value score greater than the third group, and each successful account recommendation of the training data is assigned a weight based on a value score associated with a respective group with which the successful account recommendation is associated; and selecting one or more accounts of the set of accounts to present as account recommendations based on the machine learning model.

17. The non-transitory computer-readable storage medium of claim 16, wherein the plurality of groups comprises a first group comprising one or more accounts having a number of followers lower than a threshold; and a second group comprising one or more accounts having a number of followers greater than the threshold.

18. The non-transitory computer-readable storage medium of claim 16, wherein the value score associated with a first group of the plurality of groups is derived based on a derivative of a portion of a plotted curve associated with the first group.

19. The non-transitory computer-readable storage medium of claim 18, wherein the plotted curve comprises a first variable associated with number of followers, and a second variable associated with monthly active users.

20. The non-transitory computer-readable storage medium of claim 16, wherein the selecting one or more accounts to present as account recommendations comprises ranking the set of accounts based on the machine learning model, and selecting one or more accounts of the set of accounts based on the ranking.

\* \* \* \* \*